US010662768B2

(12) United States Patent
Wheelock et al.

(10) Patent No.: US 10,662,768 B2
(45) Date of Patent: May 26, 2020

(54) METHODS OF DETERMINING A SPATIAL DISTRIBUTION OF AN INJECTED TRACER MATERIAL WITHIN A SUBTERRANEAN FORMATION (71) Applicants: Brent Wheelock, Houston, TX (US); Mehmet Deniz Ertas, Bethlehem, PA (US); Lang Feng, New Providence, NJ (US); Qiuzi Li, Clinton, NJ (US); Harry W. Deckman, Clinton, NJ (US)

(72) Inventors: Brent Wheelock, Houston, TX (US); Mehmet Deniz Ertas, Bethlehem, PA (US); Lang Feng, New Providence, NJ (US); Qiuzi Li, Clinton, NJ (US); Harry W. Deckman, Clinton, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 375 days.

(21) Appl. No.: 15/666,315

(22) Filed: Aug. 1, 2017

(65) Prior Publication Data
US 2018/0149020 A1    May 31, 2018

Related U.S. Application Data (60) Provisional application No. 62/428,382, filed on Nov. 30, 2016.

(51) Int. Cl.
*E21B 49/00* (2006.01)
*E21B 47/00* (2012.01)
(Continued)

(52) U.S. Cl.
CPC .............. *E21B 49/00* (2013.01); *E21B 47/00* (2013.01); *E21B 47/1015* (2013.01); *G01V 3/30* (2013.01);
(Continued)

(58) Field of Classification Search
CPC .......... E21B 33/12; E21B 43/04; E21B 43/26; E21B 47/00; E21B 47/1015; E21B 49/00; G01V 15/00; G01V 3/30
See application file for complete search history.

(56) References Cited

U.S. PATENT DOCUMENTS

| 2011/0140702 A1* | 6/2011 | Bloemenkamp ......... G01V 3/24 324/355 |
| 2015/0083404 A1 | 3/2015 | Wilt et al. |

(Continued)

OTHER PUBLICATIONS

LaBrecque et al., "Remote Imaging of Proppants in Hydraulic Fracture Networks Using Electromagnetics Methods: Results of Small-Scale Field Experiments," SPE-179170-MS, Society of Petroleum Engineers, SPE Hydraulic Fracturing Technology Conference, The Woodlands, Texas, USA, Feb. 9-11, 2016, pp. 1-16.

*Primary Examiner* — Son T Le
*Assistant Examiner* — Adam S Clarke
(74) *Attorney, Agent, or Firm* — ExxonMobile Upstream Research Company—Law Department (57) ABSTRACT Methods of determining a spatial distribution of an injected tracer material within a subterranean formation are disclosed, including flowing the tracer material, which includes a tracer electrical capacitance that differs from a formation electrical capacitance of a region of the subterranean formation, into the region of the subterranean formation via a wellbore. Subsequent to the flowing, the methods also include providing an input electromagnetic signal to the region of the subterranean formation. Responsive to the providing, the methods further include receiving an output electromagnetic signal from the subterranean formation. The methods further include determining the spatial distribution of the tracer material within the subterranean formation based, at least in part, on the output electromagnetic signal.

27 Claims, 4 Drawing Sheets (51) Int. Cl.
*G01V 3/30* (2006.01)
*E21B 47/10* (2012.01)
*G01V 15/00* (2006.01)
E21B 33/12 (2006.01)
E21B 43/04 (2006.01)
E21B 43/26 (2006.01)

(52) U.S. Cl.
CPC .............. *G01V 15/00* (2013.01); *E21B 33/12* (2013.01); *E21B 43/04* (2013.01); *E21B 43/26* (2013.01)

(56) References Cited

U.S. PATENT DOCUMENTS

| | | |
|---|---|---|
| 2015/0167459 A1 | 6/2015 | Sen et al. |
| 2016/0282502 A1 | 9/2016 | Sharma et al. |
| 2017/0139073 A1* | 5/2017 | Gorek .................. G01R 15/165 |

* cited by examiner

METHODS OF DETERMINING A SPATIAL DISTRIBUTION OF AN INJECTED TRACER MATERIAL WITHIN A SUBTERRANEAN FORMATION

CROSS REFERENCE TO RELATED APPLICATION

This application claims the benefit of U.S. Provisional Application Ser. No. 62/428,382, filed Nov. 30, 2016, entitled "Methods of Determining a Spatial Distribution of an Injected Tracer Material within a Subterranean Formation," the disclosure of which is incorporated herein by reference in its entirety.

FIELD OF THE DISCLOSURE

The present disclosure relates generally to methods of determining a spatial distribution of an injected tracer material within a subterranean formation and more particularly to methods that utilize an electromagnetic signal to determine the spatial distribution of the tracer material within the subterranean formation.

BACKGROUND OF THE DISCLOSURE

Wells generally include a wellbore that extends within a subterranean formation, with the subterranean formation including a material that is to be produced by the well. As an example, a wellbore of a hydrocarbon well may extend within a subterranean formation that includes a hydrocarbon, such as a liquid hydrocarbon and/or a gaseous hydrocarbon, and the hydrocarbon well may be configured to produce the hydrocarbon from the subterranean formation.

There presently are a multitude of methods to determine physical properties of regions surrounding a wellbore. These methods generally are referred to as "formation evaluation" methods, and also may be referred to herein as "wellbore logging," "well-to surface imaging," and/or "cross-well imaging" methods depending on the location of sources and/or receivers utilized with the methods.

As an example, a number of methods may be employed to determine a distribution of electromagnetic properties, such as conductivity, resistivity, admittance, or impedance, in subterranean formations around a wellbore. These properties relate the current density passing through a region in the subterranean formation to the electric field applied to that region, and in general they depend on the frequency of the electromagnetic field. Conductivity generally refers to the ratio of the magnitude of current density to the magnitude of the electric field, and resistivity is the reciprocal of conductivity. Admittance is a complex number that incorporates both the ratio of the magnitudes, and the phase shift between, the current density and electric field as a function of frequency. Impedance is the reciprocal of admittance.

It is common to inject one or more injected materials into the wellbore and/or into the subterranean formation during construction of, during completion of, during stimulation of, and/or during production from the well. The extent to which these injected materials flow from the wellbore and/or penetrate into the subterranean formation may vary from well to well or within a given well and may be governed by a variety of factors. Examples of these factors include a porosity of the subterranean formation, a permeability of the subterranean formation, a chemical composition of fluids that are present within the subterranean formation, and/or a pressure utilized to inject the one or more materials into the subterranean formation.

From a practical perspective, it may be desirable to understand and/or quantify a location of these injected materials within the subterranean formation. One means to achieve this objective is to incorporate a "tracer material" into the injected materials that can alter a physical property of the region into which it is injected. Conventional detection methodologies, such as those described above, then may be utilized before, during, and/or after the injection to monitor changes in the corresponding physical property, such as electrical admittance, and subsequently to deduce the quantity and/or location of the tracer material. However, it often is difficult to generate sufficient contrast of the physical property between the injected materials and the subterranean formation to permit accurate detection of the injected materials within the subterranean formation utilizing conventional detection methodologies. Thus, there exists a need for improved methods of determining a spatial distribution of an injected tracer material within a subterranean formation.

SUMMARY OF THE DISCLOSURE

Methods of determining a spatial distribution of an injected tracer material within a subterranean formation are disclosed herein. The methods include flowing the tracer material, which includes a tracer electrical capacitance that differs from a formation electrical capacitance of a region of the subterranean formation, into the region of the subterranean formation via a wellbore. Subsequent to the flowing, the methods also include providing an input electromagnetic signal to the region of the subterranean formation. Responsive to the providing, the methods further include receiving an output electromagnetic signal from the subterranean formation. The methods further include determining the spatial distribution of the tracer material within the subterranean formation based, at least in part, on the output electromagnetic signal.

DETAILED DESCRIPTION AND BEST MODE OF THE DISCLOSURE

FIGS. 1-5 provide examples of wells 20, of tracer materials 60, and/or of properties of wells 20 and/or of tracer materials 60 that may be utilized with methods 100, according to the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

Figure 1:
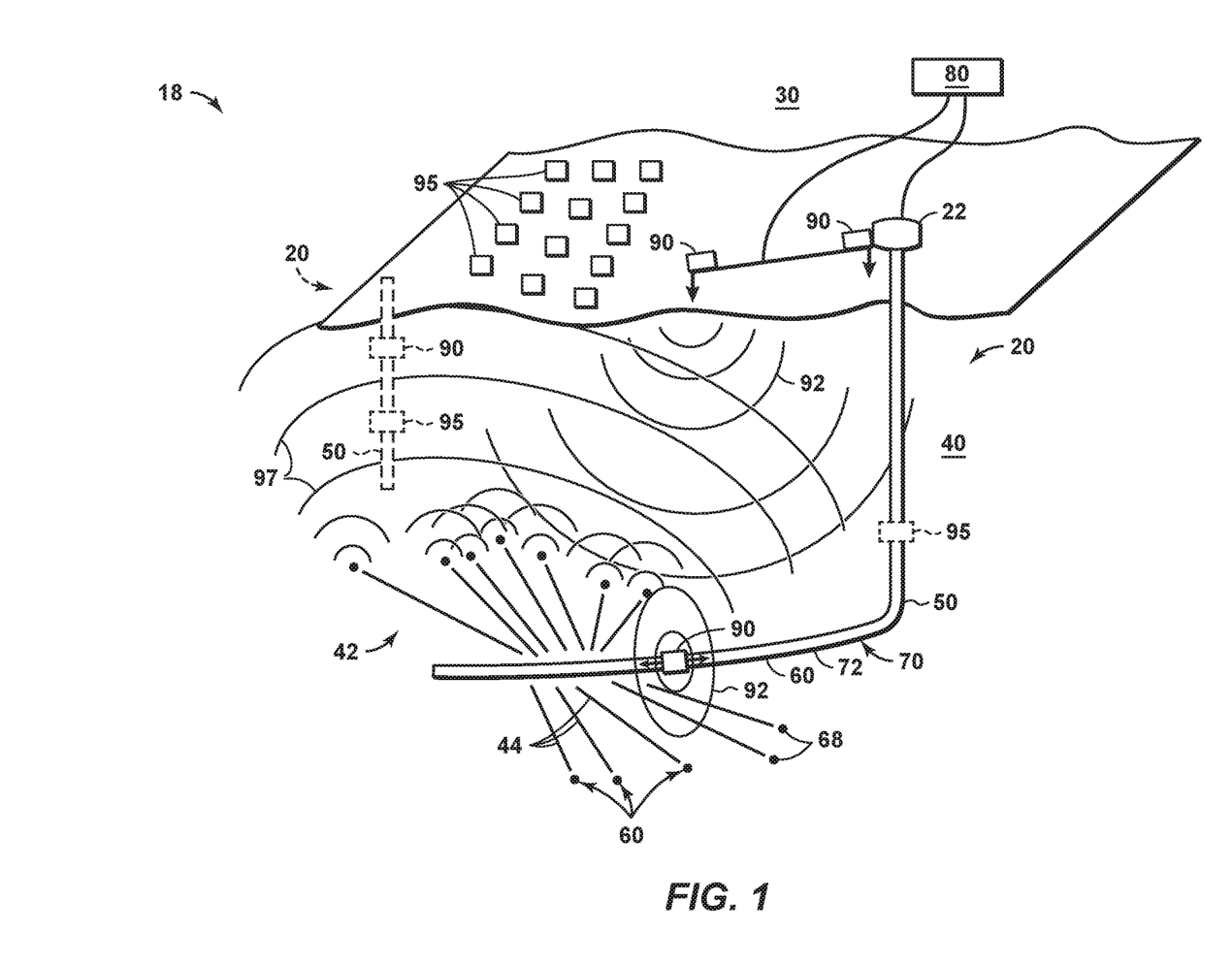
FIG. 1 is a schematic representation of a well that may be utilized with the methods according to the present disclosure.

FIG. 1 is a schematic representation of a tracer distribution monitoring system 18 that may be utilized with methods 100 according to the present disclosure. Tracer distribution monitoring system 18 also may be referred to herein as a system 18 and includes at least one well 20, which includes a wellbore 50 that extends between a surface region 30 and a subterranean formation 40. As discussed in more detail herein with reference to methods 100 of FIG. 5, a tracer material 60 is positioned within subterranean formation 40 and is in fluid contact with a pore solution 42, which extends within the subterranean formation.

As illustrated in FIG. 1, tracer material 60 may include a plurality of distinct, discrete, and/or spaced-apart particles 68, which may be positioned within the subterranean formation in any suitable manner. As an example, a slurry 70 including a carrier fluid 72 and tracer material 60 may be flowed, such as utilizing a pump 22 and/or via wellbore 50, into the subterranean formation. Upon entering the subterranean formation, tracer material 60 and/or particles 68 thereof may be distributed throughout the subterranean formation via flow through naturally occurring and/or artificially created cracks, fissures, and/or pores 44, which extend from the wellbore and/or within the subterranean formation.

Subsequently, a signal generator 80 may be utilized to power an input electrode 90 such that the input electrode generates an input electromagnetic signal 92. Input electromagnetic signal 92 may propagate, within subterranean formation 40. This may include propagation of the input electromagnetic signal within wellbore 50, within a fluid that extends within wellbore 50, within a subterranean strata that forms and/or defines subterranean formation 40, and/or within a fluid that extends within the subterranean formation. Input electromagnetic signal 92 may interact with subterranean formation 40 and tracer material 60 and produce and/or generate an output electromagnetic signal 97. Due to the properties of the tracer material 60, this output electromagnetic signal 97 differs from the output electromagnetic signal when the tracer material 60 is absent from the subterranean formation. As examples, the output electromagnetic signal in the presence of tracer material 60 may have a different amplitude and/or phase when compared to the output electromagnetic signal when the tracer material 60 is absent from the subterranean formation.

As discussed in more detail herein, tracer material 60 may be selected to interact with the input electromagnetic signal in a manner that is significantly different from an interaction between the input electromagnetic signal and native and/or naturally occurring materials that are present within and/or that define the subterranean formation. Stated another way, tracer material 60 may be selected to provide significant contrast with the native and/or naturally occurring materials. As such, output electromagnetic signal 97, which is produced via interaction between the input electromagnetic signal and the tracer material, may differ significantly, or in a quantifiable manner, from other signals that may be generated via interactions between the input electromagnetic signal and the native and/or naturally occurring materials. Such a difference may be referred to herein as providing "contrast" or "electromagnetic contrast" between the tracer material and the subterranean formation.

Output electromagnetic signal 97 then may propagate, within the subterranean formation and/or within any suitable structure and/or fluid that extends within the subterranean formation, to one or more output electrodes 95. Output electrodes 95 may receive and/or quantify the output electromagnetic signal, thereby permitting characterization of the output electromagnetic signal and/or permitting a comparison between the input electromagnetic signal and the output electromagnetic signal. In an alternative embodiment, in addition, an input electromagnetic signal 92 is provided, and output electromagnetic signal 97 is received, before any tracer material 60 is injected into the subterranean formation. Such a method, which is discussed in more detail herein with reference to FIG. 5, may permit a comparison between the output electromagnetic signal before and after the injection of the tracer material.

It is within the scope of the present disclosure that the input electromagnetic signal and/or the output electromagnetic signal may include, or be, any suitable signal that may interact with tracer material 60. As examples, the input electromagnetic signal may include, or be, an input AC electromagnetic signal, an input AC electric signal, and/or an input AC magnetic signal. Similarly, the output electromagnetic signal may include, or be, an output AC electromagnetic signal, an output AC electric signal, and/or an output AC magnetic signal.

As illustrated in FIG. 1, system 18 may include any suitable number of input electrodes 90, including a single input electrode 90 or a plurality of input electrodes 90, and input electrodes 90 may be positioned in any suitable manner. As examples, input electrodes 90 may be positioned within surface region 30, along wellbore 50 that was utilized to position the tracer material within the subterranean formation, and/or within a separate wellbore 50, as illustrated in dashed lines, that is spaced-apart from the wellbore that was utilized to position the tracer material within the subterranean formation. Similarly, system 18 also may include any suitable number of output electrodes 95, including a single output electrode 95 or a plurality of output electrodes 95, and output electrodes 95 may be positioned in any suitable manner. As examples, output electrodes 95 may be positioned within surface region 30, along wellbore 50 that was utilized to position the tracer material within the subterranean formation, and/or within the separate wellbore 50. Input electrodes 90 and/or output electrodes 95 may be positioned according to known and/or established electromagnetic geophysical methods. An example of input electrodes 90 includes magnetic induction coils, which may be utilized to provide the input electromagnetic signal. An example of output electrodes 95 includes magnetometers, which may be utilized to detect the output electromagnetic signal.

Figure 2:
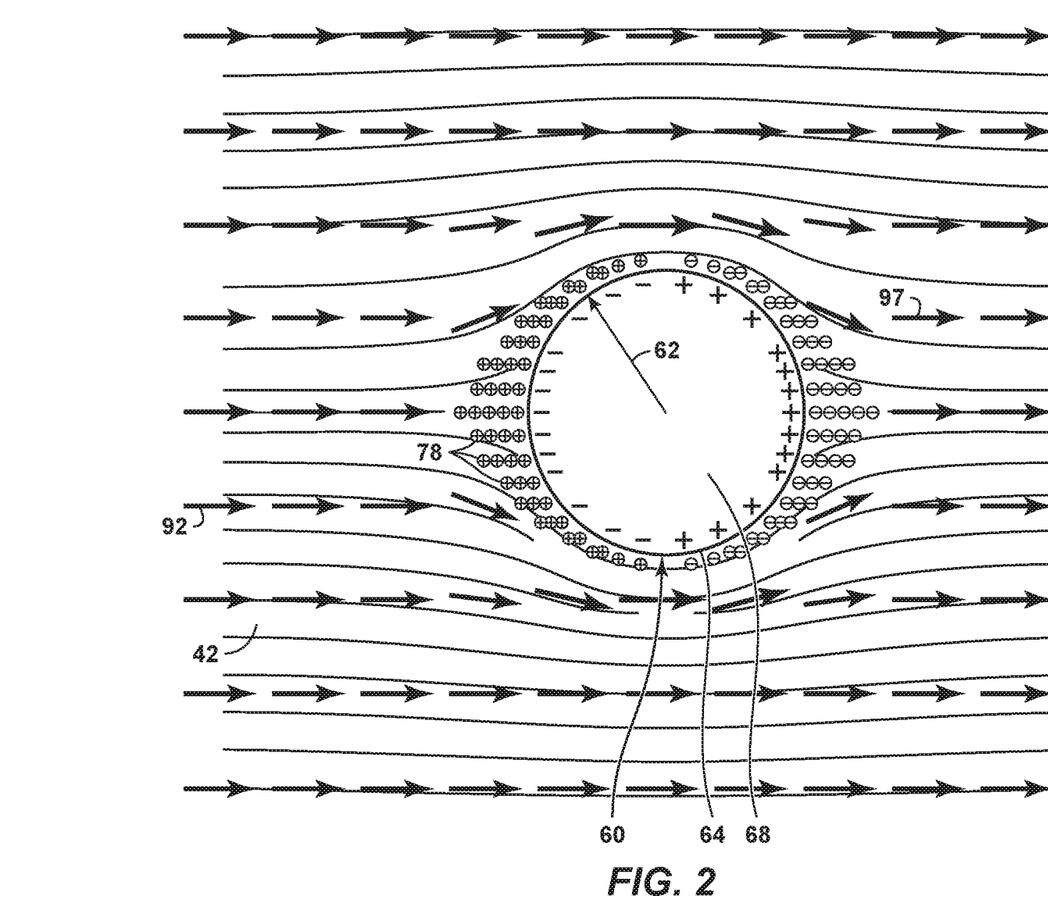
FIG. 2 is a schematic representation of a tracer material, according to the present disclosure, suspended within a pore solution and interacting with an input electromagnetic signal to generate an output electromagnetic signal.

FIG. 2 is a schematic representation of a tracer material 60, according to the present disclosure, in the form of an injected particle 68 that is suspended within a pore solution 42 and interacting with an input electromagnetic signal 92 to generate an output electromagnetic signal 97. As discussed in more detail herein, injected particle 68 may be a single-component particle defined solely by tracer material 60 or a composite particle that includes tracer material 60 together with one or more other materials.

Tracer material 60 generally is electrically conductive, with a conductivity that is similar to, higher than, or significantly higher than, the surrounding pore solution. As examples, the electrical conductivity of tracer material 60 may be at least one third the electrical conductivity of the surrounding pore solution, at least equal to the electrical conductivity of the surrounding pore solution, at least three times the electrical conductivity of the surrounding pore solution, and/or at least ten times the electrical conductivity of the surrounding pore solution. As such, the tracer material interacts with input electromagnetic signal 92 via charge accumulation at and/or near an outer surface 64 of the tracer material, as indicated by the "+" and "−" signs in FIG. 2. This charge accumulation, within the tracer material, is balanced by a corresponding accumulation of charged particles 78 near outer surface 64 and within pore solution 42. This accumulation of charged particles 78, which physically move, or oscillate, under the influence of input electromagnetic signal 92, causes a capacitive phase shift between the current density and the electric field, wherever the tracer particles are present. The capacitive phase shift corresponds to the phase of the electric field lagging the phase of the current density. The resulting change in the relationship between the input electromagnetic signal 92 and output electromagnetic signal 97 may be utilized by methods 100 to determine the spatial distribution of the tracer material within the subterranean formation.

Figure 3:
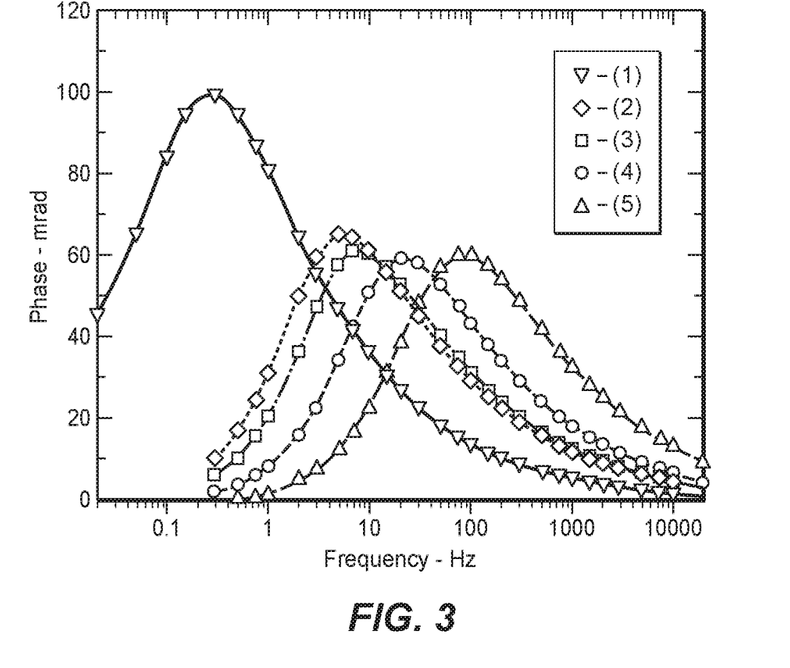
FIG. 3 is a plot illustrating a phase shift between a current density and an electric field when a tracer material is present in a pore solution.
Figure 4:
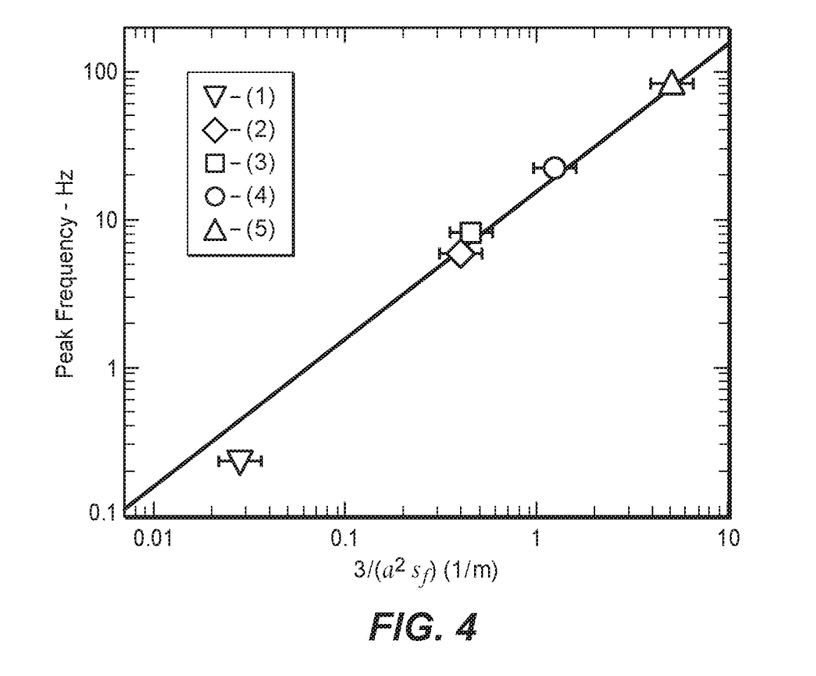
FIG. 4 is a plot illustrating peak frequency vs. a size parameter for tracer materials according to the present disclosure.
Figure 5:
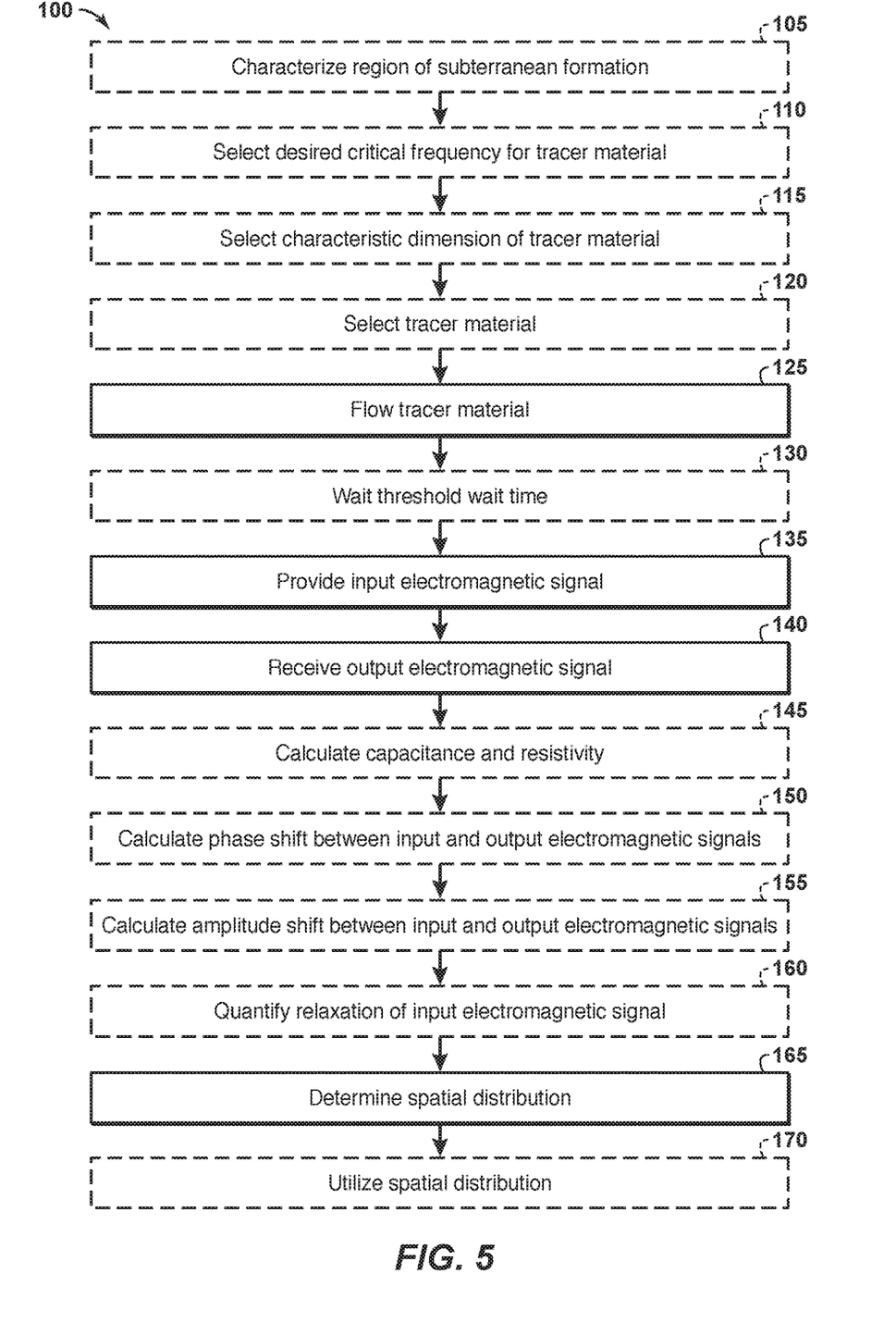
FIG. 5 is a flowchart depicting methods, according to the present disclosure, of determining a spatial distribution of an injected tracer material within a subterranean formation.

FIG. 3 is a plot illustrating a phase shift between a current density and an electric field for tracer materials 60 that are in a pore solution 42, according to the present disclosure, as a function of frequency of the input electromagnetic signal. This phase shift as a function of frequency is plotted for a plurality of different tracer materials. FIG. 4 is a plot illustrating a peak frequency for the tracer materials of FIG. 3 as a function of a size parameter of the tracer material. When the conductivity of the tracer material 60 is substantially greater than the conductivity of the surrounding pore solution 42, the maximum phase shift exhibited in the phase shift vs. frequency plot of FIG. 3 may be described by equation (1).

$$\phi_c = \frac{9}{4} \frac{v_{cond}}{1 + 3v_{cond}} \quad (1)$$

where $\phi_c$ is the maximum phase shift (i.e., a peak in the phase shift vs. frequency plot of FIG. 3) and $v_{cond}$ is a volume fraction of the tracer material in the media within which the measurement is performed (e.g., the subterranean formation). Stated another way, and as discussed in more detail herein with reference to FIG. 5, methods 100 may measure the phase shift in the output electromagnetic signal as a function of the frequency of the input electromagnetic signal within a given region of the subterranean formation. These methods then may determine a maximum value, or magnitude, of the phase shift and may utilize this maximum value of the phase shift to calculate the volume fraction of the tracer material within the given region of the subterranean formation, such as via inversion of equation (1).

The frequency at which the maximum value of the phase shift occurs, which also may be referred to herein as a peak frequency and/or as a critical frequency of the tracer material, may be described by equation 2.

$$f_c = \frac{\sigma_w}{\pi C_o} \frac{3}{a^2 s_f} \quad (2)$$

where $f_c$ is the desired critical frequency of the tracer material, $\sigma_w$ is the pore solution electrical conductivity of the region of the subterranean formation, $C_o$ is the electrode-electrolyte capacitance per unit area for the tracer material, $a$ is the average effective particle radius of the tracer material, which is indicated in FIG. 2 at 62, and $s_f$ is the surface area to volume ratio for the tracer material. FIG. 4 illustrates a fit of equation 2 to the experimental data of FIG. 3. As may be seen in FIG. 4, the size parameter (i.e., $3/a^2s_f$) of the tracer material may be utilized to predict, regulate, and/or specify the critical frequency of the tracer material, $f_c$. Particles in the tracer material may be formed from a porous conductor whose effective radius and surface area to volume ratio may be tailored to the specific needs of each application. As such, and as discussed in more detail herein with reference to FIG. 5, methods 100 may include selecting the tracer material to have a desired, target, and/or specified critical frequency via variation of the size parameter of the tracer material.

The present disclosure recognizes that naturally occurring materials, which are present within a subterranean formation, generally exhibit very little capacitive behavior and instead behave more as electrical conductors. Furthermore, whenever present, the capacitive behavior is typically exhibited over a much broader frequency range. For formations that exhibit some level of capacitive behavior, the critical frequency of the tracer material may be chosen sufficiently away from the characteristic relaxation time of the subterranean formation.

In addition, the propagation of the electromagnetic signal in a conductor causes inductive phase shifts between the input electromagnetic signal and output electromagnetic signal, wherein the electric field leads the current density. Thus, the capacitive phase shift caused by the tracer material, when present, provides a significant amount of contrast, or signal differentiation, which may be utilized to determine a location, or spatial distribution, of tracer material 60 within the subterranean formation, as discussed in more detail herein with reference to methods 100 of FIG. 5.

Tracer material 60 may include and/or be any suitable tracer material that may capacitively interact with input electromagnetic signal 92 to produce and/or generate output electromagnetic signal 97, as illustrated in FIGS. 1-2. As examples, tracer material 60 may include one or more of a particulate carbon black material, a particulate mesoporous carbon black material, a particulate activated carbon material, a particulate electrically conductive material, a particulate metal, iron pyrite, and/or a Janus particle. When the tracer material includes the Janus particle, the Janus particle may include two different, or distinct, regions and/or components. These two distinct regions, or components, may facilitate segregation of the Janus particle at an interface that extends within the subterranean formation. Examples of the interface include an oil-water interface, an air-water interface, an air-oil interface, a rock-water interface, and/or a rock-oil interface.

It is within the scope of the present disclosure that tracer material 60 may include, consist of, and/or consist essentially of a single material and/or a homogeneous material. Alternatively, it is also within the scope of the present disclosure that tracer material 60 may form a portion of a composite particle that includes one or more other materials. An example of such a composite particle may include the Janus particle. As another example, the composite particle may include a core material that is coated with the tracer material. More specific examples of the core material include a ceramic material and/or a proppant.

FIG. 5 is a flowchart depicting methods 100, according to the present disclosure, of determining a spatial distribution of an injected tracer material, such as tracer material 60 of FIGS. 1-2, within a subterranean formation, such as subterranean formation 40 of FIG. 1. Methods 100 may include characterizing the subterranean formation at 105, selecting a desired critical frequency for a tracer material at 110, selecting a characteristic dimension of the tracer material at 115, and/or selecting the tracer material at 120. Methods 100 include flowing the tracer material at 125 and may include waiting a threshold wait time at 130. Methods 100 further include providing an input electromagnetic signal at 135 and receiving an output electromagnetic signal at 140. Methods 100 also may include calculating a capacitance and resistivity at 145, calculating a phase shift at 150, calculating an amplitude shift at 155, and/or quantifying a relaxation at 160. Methods 100 further include determining a spatial distribution at 165, and may include utilizing the spatial distribution at 170.

Characterizing the subterranean formation at 105 may include characterizing a portion, region, fraction, and/or subset of the subterranean formation. In addition, the characterizing at 105 may include characterizing, determining, calculating, quantifying, and/or measuring any suitable property, or parameter, of the subterranean formation. As examples, the characterizing at 105 may include characterizing a resistivity of the region of the subterranean formation and/or characterizing a capacitance of the region of the subterranean formation. Under these conditions, the characterizing at 105 also may include characterizing a pore solution electrical conductivity of the region of the subterranean formation, $\sigma_w$, based, at least in part, on the resistivity of the region of the subterranean formation.

The resistivity, or direct current resistivity, and/or capacitance of the region of the subterranean formation may be characterized in any suitable manner. As an example, the characterizing at 105 may include providing an electromagnetic signal to the region of the subterranean formation, such as may be provided by an input electrode. Under these conditions, the characterizing at 105 further may include calculating the resistivity and/or the capacitance of the region of the subterranean formation based, at least in part, on a change in a magnitude and/or shape of the electromagnetic signal, such as may be received by an output electrode.

As another example, the characterizing at 105 may include characterizing a time-domain impulse response of the region of the subterranean formation. As yet another example, the characterizing at 105 may include characterizing a frequency response of the region of the subterranean formation, such as to determine a critical frequency of the region of the subterranean formation.

The characterizing the frequency response of the region of the subterranean formation may include characterizing a naturally occurring phase vs. frequency trend for the subterranean formation and/or characterizing a naturally occurring amplitude vs. frequency trend for the subterranean formation. Under these conditions, the critical frequency of the subterranean formation may include, or be, a frequency at which the region of the subterranean formation exhibits a maximum in the naturally occurring phase shift vs. frequency trend.

As a more specific example, the characterizing the frequency response of the subterranean formation may include providing a test input AC electromagnetic signal to the region of the subterranean formation and varying the test input AC electromagnetic signal through a test frequency range. Under these conditions, the characterizing the frequency response of the region of the subterranean formation further may include receiving a test output AC electromagnetic signal from the region of the subterranean formation and determining the frequency response of the subterranean formation based, at least in part, on the test input AC electromagnetic signal and on the test output AC electromagnetic signal.

As another example, the characterizing at 105 may include characterizing an average effective pore throat diameter of the region of the subterranean formation. As another example, the characterizing at 105 may include mathematically, theoretically, and/or experimentally characterizing the region of the subterranean formation.

It is within the scope of the present disclosure that the characterizing at 105 may include characterizing a bulk, or average, property, or parameter, of the subterranean formation. Additionally or alternatively, it is also within the scope of the present disclosure that the characterizing at 105 may include characterizing a spatial distribution of the property, or parameter, as a function of location within the subterranean formation.

Selecting the desired critical frequency for the tracer material at 110 may include selecting any suitable desired critical frequency, $f_c$, for the tracer material. As discussed in more detail herein with reference to equation (2), the desired critical frequency for the tracer material may include, or be, a frequency at which the tracer material exhibits a maximum in a phase shift vs. frequency trend thereof.

The selecting at 110 may be performed in any suitable manner and/or may be based upon any suitable criteria. As an example, the selecting at 110 may include selecting based, at least in part, on the characterizing at 105. As another example, the selecting at 110 may include selecting such that the desired critical frequency of the tracer material differs from the critical frequency of the region of the subterranean formation. Such a difference between the critical frequency of the tracer material and the critical frequency of the region of the subterranean formation may provide electromagnetic contrast between the tracer material and the subterranean formation, thereby permitting and/or facilitating the determining at 165. A desired, target, or minimum difference between the critical frequency of the tracer material and the critical frequency of the region of the subterranean formation may be based upon any suitable criteria. Examples of these criteria include a desired spatial resolution for the determining at 165, a depth, within the subterranean formation, at which methods 100 are performed, a magnitude of naturally occurring environmental noise within the subterranean formation, a desired penetration of the input electromagnetic signal into the subterranean formation, and/or a desired signal-to-noise ratio for the receiving at 140.

The selecting at 110 may include selecting any suitable critical frequency for the tracer material. Examples of the critical frequency for the tracer material include critical frequencies of at least 0.001 Hertz (Hz), at least 0.005 Hz, at least 0.01 Hz, at least 0.05 Hz, at least 0.1 Hz, at least 0.5 Hz, at least 1 Hz, at least 10 Hz, at least 50 Hz, at least 100 Hz, at least 200 Hz, at most 10,000 Hz, at most 5,000 Hz, at most 2,500 Hz, at most 1,000 Hz, at most 750 Hz, at most 500 Hz, and/or at most 250 Hz.

The selecting at 110 may be performed with any suitable timing and/or sequence during methods 100. As an example, the selecting at 110 may be performed subsequent to the characterizing at 105. As another example, the selecting at 110 may be performed prior to the flowing at 125.

Selecting the characteristic dimension of the tracer material at 115 may include selecting any suitable characteristic dimension for the tracer material. As an example, the tracer material may include, or be, a particulate tracer material that includes a plurality of particles. Under these conditions, the characteristic dimension for the tracer material may include, or be, a radius of the plurality of particles, an average radius of the plurality of particles, an effective radius of the plurality of particles, and/or an average effective particle radius, a, of the plurality of particles. As used herein, the phrase "effective radius" refers to a radius of a sphere that has the same volume as the particle for which the effective radius is determined.

The selecting at 115 may include selecting based upon any suitable criteria. As an example, the selecting at 115 may include selecting based, at least in part, on the average effective pore throat diameter of the region of the subterranean formation, such as may be determined during the characterizing at 105. As another example, the selecting at 115 may include selecting such that the characteristic dimension is less than the average effective pore throat diameter. As yet another example, the selecting at 115 may include selecting such that the plurality of particles will, on average, flow through the average effective pore throat diameter of the region of the subterranean formation.

As another example, and subsequent to the flowing at 125, the tracer material also may function as, or may be, a proppant within the region of the subterranean formation. Under these conditions, the selecting at 115 may include selecting such that the proppant facilitates fluid flow within the region of the subterranean formation.

It is within the scope of the present disclosure that the selecting at 115 may include selecting such that the characteristic dimension for the tracer material exhibits a unimodal distribution. Stated another way, the selecting at 115 may include selecting such that the plurality of particles in the particulate tracer material have similar, the same, or at least substantially the same, characteristic dimensions. Alternatively, it is also within the scope of the present disclosure that the selecting at 115 may include selecting such that the characteristic dimension of the tracer material exhibits a multimodal distribution. State another way, the selecting at 115 may include selecting such that a first subset of the plurality of particles in the particulate tracer material have a first characteristic dimension and also such that a second subset of the plurality of particles in the particulate tracer material have a second characteristic dimension that is different from the first characteristic dimension.

The selecting at 115 may be performed with any suitable timing and/or sequence during methods 100. As an example, the selecting at 115 may be performed subsequent to the selecting at 110. As another example, the selecting at 115 may be performed prior to the flowing at 125.

Selecting the tracer material at 120 may include selecting based upon any suitable criteria, and examples of the tracer material are disclosed herein. As examples, the selecting at 120 may include selecting based, at least in part, on the characterizing at 105, on the selecting at 110, and/or on the selecting at 115. As more specific examples, the selecting at 120 may include selecting based, at least in part, on the desired critical frequency for the tracer material, such as was selected during the selecting at 110, and/or on the characteristic dimension for the tracer material, such as was selected during the selecting at 115. As a more specific example, the selecting at 120 may include selecting an electrode-electrolyte capacitance per unit area for the tracer material, $C_o$, and a surface area to volume ratio for the tracer material, $s_f$, for a given characteristic dimension for the tracer material. This may include selecting such that an actual critical frequency of the tracer material corresponds to, equals, or is within a threshold frequency difference of, the desired critical frequency of the tracer material. Additionally or alternatively, the selecting at 120 also may include utilizing equation (2) to select, or calculate, the electrode-electrolyte capacitance per unit area for the tracer material, the surface area to volume ratio for the tracer material, and/or a product of the electrode-electrolyte capacitance per unit area for the tracer material and the surface area to volume ratio for the tracer material based upon the desired critical frequency for the tracer material, the pore solution electrical conductivity of the region of the subterranean formation, and the average effective particle radius of the tracer material.

As another example, the selecting at 120 may include selecting such that the electrode-electrolyte capacitance per unit area of the tracer material is inversely proportional to the desired critical frequency of the tracer material, is proportional to the pore solution electrical conductivity of the region of the subterranean formation, is inversely proportional to a square of the average effective particle radius of the tracer material, and/or is inversely proportional to the surface area to volume ratio of the tracer material. As yet another example, the selecting at 120 may include selecting such that the surface area to volume ratio of the tracer material is inversely proportional to the desired critical frequency of the tracer material, is proportional to the pore solution electrical conductivity of the region of the subterranean formation, is inversely proportional to a square of the average effective particle radius of the tracer material, and/or is inversely proportional to the electrode-electrolyte capacitance per unit area of the tracer material.

As another example, the selecting at 120 may include selecting such that a product of the electrode-electrolyte capacitance per unit area of the tracer material and the surface area to volume ratio of the tracer material is inversely proportional to the desired critical frequency of the tracer material, is proportional to the pore solution electrical conductivity of the region of the subterranean formation, and/or is inversely proportional to a square of the average effective particle radius of the tracer material. As yet another example, the selecting at 120 may include selecting such that an electrical conductivity of the tracer material is greater than the pore solution electrical conductivity of a pore solution that extends within the subterranean formation. This pore solution, which is illustrated in FIGS. 1-2 at 42, may include a naturally occurring pore solution, a carrier fluid utilized to position the tracer material within the subterranean formation, another fluid that is present within the subterranean formation, and/or a mixture of the naturally occurring pore solution, the carrier fluid, and the other fluid.

The selecting at 120 may be performed with any suitable timing and/or sequence during methods 100. As examples, the selecting at 120 may be performed subsequent to the characterizing at 105, subsequent to the selecting at 110, subsequent to the selecting at 115, and/or prior to the flowing at 125.

Flowing the tracer material at 125 may include flowing the tracer material into the region of the subterranean formation. This may include flowing the tracer material via a wellbore that extends within the subterranean formation. As discussed in more detail herein, the tracer material includes, has, and/or defines a tracer material electrical capacitance that differs from, is distinct from, and/or provides contrast with, a formation electrical capacitance of the region of the subterranean formation.

The flowing at 125 may be accomplished in any suitable manner. As examples, the flowing at 125 may include injecting the tracer material into the region of the subterranean formation via the wellbore and/or pumping a slurry of the tracer material and a carrier fluid into the region of the subterranean formation via the wellbore.

The flowing at 125 may be performed as part of any suitable downhole process. As examples, the flowing at 125 may include flowing to stimulate the region of the subterranean formation, to fracture the region of the subterranean formation, and/or to prop at least one fracture within the region of the subterranean formation.

It is within the scope of the present disclosure that the flowing at 125 may include flowing for at least a threshold flow time. This may include flowing for at least the threshold flow time prior to the providing at 135. Examples of the threshold flow time include threshold flow times of at least 1 minute, at least 5 minutes, at least 10 minutes, at least 20 minutes, at least 30 minutes, at least 1 hour, at least 2 hours, at least 4 hours, at least 6 hours, at least 12 hours, at least 1 day, at least 2 days, at least 3 days, at least 4 days, and/or at least 7 days.

It is within the scope of the present disclosure that the subterranean formation may have, include, and/or define a pore throat size distribution and that the tracer material may have, include, and/or define a particle size distribution. Under these conditions, the flowing at 125 may include segregating the tracer material, within the subterranean formation, based, at least in part, on the particle size distribution and on the pore throat size distribution. Since, as described by equation (2), the critical frequency of the tracer material varies with the characteristic dimension of the tracer material, such segregation may be detected, determined, and/or measured via differences in the critical frequency of the tracer material within different areas within the region of the subterranean formation. This may permit detection of and/or inference about the pore throat size within the different areas within the region of the subterranean formation.

Additionally or alternatively, the flowing at 125 also may include segregating the tracer material within the subterranean formation and based, at least in part, on a chemical affinity of the tracer material for a material that extends within a region of the subterranean formation. Examples of such affinity-based segregation are discussed herein with reference to the Janus particle embodiment of the tracer material.

Waiting the threshold wait time at 130 may include waiting any suitable threshold wait time subsequent to completion of the flowing at 125 and prior to initiating the providing at 135. Examples of the threshold wait time include threshold wait times of at least 1 minute, at least 5 minutes, at least 10 minutes, at least 20 minutes, at least 30 minutes, at least 1 hour, at least 3 hours, at least 6 hours, at least 12 hours, and/or at least 24 hours. The waiting at 130 may include waiting to permit and/or facilitate flow of the tracer material into the subterranean formation and/or segregation of the tracer material within the subterranean formation.

Providing the input electromagnetic signal at 135 may include providing any suitable input electromagnetic signal to the region of the subterranean formation. As examples, the providing at 135 may include providing an input AC electric signal to the region of the subterranean formation and/or providing an input AC magnetic signal to the region of the subterranean formation.

When the providing at 135 includes providing the input AC electric signal, the providing at 135 further may include varying a frequency of the input AC electric signal within, through, and/or across an input frequency range. The input frequency range may be selected to include the actual critical frequency of the tracer material and/or the desired critical frequency of the tracer material, thereby facilitating detection of the tracer material via the providing at 135 and the receiving at 140. Examples of the input frequency range include frequencies of at least 0.001 Hertz (Hz), at least 0.005 Hz, at least 0.01 Hz, at least 0.05 Hz, at least 0.1 Hz, at least 0.5 Hz, at least 1 Hz, at least 10 Hz, at least 50 Hz, at least 100 Hz, at least 200 Hz, at most 10,000 Hz, at most 5,000 Hz, at most 2,500 Hz, at most 1,000 Hz, at most 750 Hz, at most 500 Hz, and/or at most 250 Hz.

The providing at 135 may be performed with any suitable timing and/or sequence during methods 100. As examples, the providing at 135 may be performed subsequent to the flowing at 125, subsequent to the waiting at 130, and/or prior to the receiving at 140. As discussed in more detail herein with reference to FIG. 1, the providing at 135 may include providing with, via, and/or utilizing an electromagnetic geophysical method. Additionally or alternatively, the providing at 135 may include providing with an input electrode, such as input electrode 90 of FIG. 1, providing from a surface region, such as surface region 30 of FIG. 1, providing from the subterranean formation, such as subterranean formation 40 of FIG. 1, providing from the wellbore, such as wellbore 50 of FIG. 1, and/or providing from another wellbore that is spaced-apart from the wellbore, such as is discussed herein with reference to FIG. 1.

Receiving the output electromagnetic signal at 140 may include receiving the output electromagnetic signal from the region of the subterranean formation and may be subsequent, or responsive, to the providing at 135. Examples of the output electromagnetic signal include an output AC electric signal and/or an output AC magnetic signal.

As discussed in more detail herein with reference to FIG. 2, the tracer material may interact with, or modify, the input electromagnetic signal to generate the output electromagnetic signal. As such, the receiving at 140 may include receiving, within the output electromagnetic signal, information regarding the tracer material and/or information regarding the spatial distribution of the tracer material within the subterranean formation.

The receiving at 140 may include receiving the output electromagnetic signal within, through, and/or across an output frequency range. The output frequency range may be selected to include the actual critical frequency of the tracer material and/or the desired critical frequency of the tracer material, thereby facilitating detection of the tracer material via the providing at 135 and the receiving at 140. Examples of the output frequency range include frequencies of at least 0.001 Hertz (Hz), at least 0.005 Hz, at least 0.01 Hz, at least 0.05 Hz, at least 0.1 Hz, at least 0.5 Hz, at least 1 Hz, at least 10 Hz, at least 50 Hz, at least 100 Hz, at least 200 Hz, at most 10,000 Hz, at most 5,000 Hz, at most 2,500 Hz, at most 1,000 Hz, at most 750 Hz, at most 500 Hz, and/or at most 250 Hz. As a more specific example, the output frequency range may correspond to, may be equal to, may include, and/or may include at least a subset of the input frequency range.

As discussed in more detail herein with reference to FIG. 1, the receiving at 140 may include receiving with, via, and/or utilizing an electromagnetic geophysical method. Additionally or alternatively, the receiving at 140 may include receiving with an output electrode, such as output electrode 95 of FIG. 1, receiving from the surface region, such as surface region 30 of FIG. 1, receiving from the subterranean formation, such as subterranean formation 40 of FIG. 1, receiving from the wellbore, such as wellbore 50 of FIG. 1, and/or receiving from another wellbore that is spaced-apart from the wellbore, such as is discussed herein with reference to FIG. 1.

Calculating the capacitance and resistivity at 145 may include calculating the capacitance of the region of the subterranean formation and/or calculating the resistivity of the region of the subterranean formation. This may include calculating the capacitance and/or the resistance as a function of location within the region of the subterranean formation and may be based, at least in part, on the input electromagnetic signal, on the output electromagnetic signal, on both the input electromagnetic signal and the output electromagnetic signal, and/or on a comparison between the input electromagnetic signal and the output electromagnetic signal.

Calculating the phase shift at 150 may include calculating a phase shift between the input electromagnetic signal and the output electromagnetic signal. The calculating at 150 may include calculating, or quantifying, the phase shift as a function of frequency of the input electromagnetic signal and/or of the output electromagnetic signal. Additionally or alternatively, the calculating at 150 also may include quantifying the phase shift as a function of location within the region of the subterranean formation.

Calculating the amplitude shift at 155 may include calculating an amplitude shift between the input electromagnetic signal and the output electromagnetic signal. The calculating at 155 may include calculating, or quantifying, the amplitude shift as a function of the frequency of the input electromagnetic signal and/or of the output electromagnetic signal. Additionally or alternatively, the calculating at 155 also may include quantifying the amplitude shift as a function of location within the region of the subterranean formation.

Quantifying the relaxation at 160 may include quantifying a relaxation of the input electromagnetic signal within the region of the subterranean formation. As an example, and subsequent to the providing at 135 but prior to the receiving at 140, the quantifying at 160 may include ceasing the providing at 135. Under these conditions, the receiving at 140 may be utilized to quantify the relaxation of the input electromagnetic signal within the subterranean formation. This may include quantifying as a function of frequency of the input electromagnetic signal and/or of the output electromagnetic signal. Additionally or alternatively, this also may include quantifying as a function of location within the region of the subterranean formation.

Determining the spatial distribution at 165 may include determining the spatial distribution within the region of the subterranean formation and may be based, at least in part, on the output electromagnetic signal, on the input electromagnetic signal, on both the output electromagnetic signal and the input electromagnetic signal, and/or on a comparison between the output electromagnetic signal and the input electromagnetic signal. The determining at 165 may be accomplished in any suitable manner.

As an example, and when methods 100 include the calculating at 145, the determining at 165 may include determining based, at least in part, on the capacitance of the subterranean formation and the resistivity of the subterranean formation. As another example, and when methods 100 include the calculating at 155, the determining at 165 may include spatially correlating the amplitude shift with a given location within the region of the subterranean formation. As yet another example, and when methods 100 include the quantifying at 160, the determining at 165 may include spatially correlating the relaxation of the input electromagnetic signal with a given location within the region of the subterranean formation.

As another example, the determining at 165 may include signal processing the input electromagnetic signal to generate a processed input electromagnetic signal and signal processing the output electromagnetic signal to generate a processed output electromagnetic signal. Under these conditions, the determining at 165 further may include inverting the processed input electromagnetic signal and the processed output electromagnetic signal based upon one or more properties of the processed input electromagnetic signal and/or of the processed output electromagnetic signal indicative of the electrical capacitance of the tracer material.

As a more specific example, and when methods 100 include the calculating at 150, the determining at 165 may include spatially correlating a maximum phase shift observed at a corresponding frequency with a given location within the region of the subterranean formation. Under these conditions, the determining at 165 may include calculating a concentration, or volume fraction, of the tracer material within the given location based, at least in part, on the maximum phase shift. As an example, the calculating the concentration may include solving equation (1) for $v_{cond}$, or the volume fraction of the tracer material within the given location, for a given $\phi_c$, or the maximum phase shift. Under these conditions, the determining at 165 further may include identifying the tracer material, or a corresponding tracer material, which is positioned within the given location within the region of the subterranean formation, based on the corresponding frequency, as discussed herein with reference to FIGS. 3-4.

It is within the scope of the present disclosure that the receiving at 140 may include quantifying at least one property of the output electromagnetic signal as a function of location within the region of the subterranean formation. Under these conditions, the determining at 165 may include inverting the at least one property of the output electromagnetic signal as a function of location within the subterranean formation. As a more specific example, the determining at 165 may include determining the resistivity as a function of location within the region of the subterranean formation and also determining the capacitance as a function of location within the subterranean formation. Under these conditions, methods 100 further may include calculating the spatial distribution of the tracer material within the region of the subterranean formation based, at least in part, on the resistivity and capacitance as a function of location within the region of the subterranean formation.

Utilizing the spatial distribution at 170 may include utilizing the spatial distribution of the tracer material in any suitable manner. As examples, the utilizing at 170 may include utilizing the spatial distribution of the tracer material to determine a pore throat size distribution within the subterranean formation, to determine a porosity of the subterranean formation, to determine an extent of a fracture that extends within the subterranean formation, to determine a seal integrity of a gravel pack that extends within the subterranean formation, to determine an extent of the gravel pack, and/or to determine an extent of mud escape into the subterranean formation during drilling of the wellbore.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A method of determining a spatial distribution of an injected tracer material within a subterranean formation, the method comprising:
characterizing the region of the subterranean formation;
selecting a tracer material for injection into the subterranean formation based at least in part on a desired critical frequency for the tracer material, $f_c$, based at least in part on the characterizing the region of the subterranean formation;

flowing, via a wellbore that extends within the subterranean formation, the selected tracer material into a region of the subterranean formation, wherein the tracer material includes a tracer electrical capacitance that differs from a formation electrical capacitance of the region of the subterranean formation;

subsequent to the flowing, providing an input electromagnetic signal to the region of the subterranean formation;

responsive to the providing, receiving an output electromagnetic signal from the region of the subterranean formation; and determining the spatial distribution of the tracer material within the region of the subterranean formation based, at least in part, on the output electromagnetic signal.

2. The method of claim 1, wherein, subsequent to the determining the spatial distribution of the tracer material within the region of the subterranean formation, the method further includes utilizing the spatial distribution of the tracer material to at least one of:
  (i) determine a pore throat size distribution within the subterranean formation;
  (ii) determine a porosity of the subterranean formation;
  (iii) determine an extent of a fracture that extends within the subterranean formation;
  (iv) determine a seal integrity of a seal that is associated with the wellbore;
  (v) determine an integrity of a gravel pack that extends within the wellbore;
  (vi) determine an extent of the gravel pack; and
  (vii) determine an extent of mud escape, into the subterranean formation, during drilling of the wellbore.

3. The method of claim 1, wherein the characterizing the region of the subterranean formation includes characterizing a resistivity and a capacitance of the region of the subterranean formation.

4. The method of claim 3, wherein the characterizing the resistivity of the region of the subterranean formation includes characterizing a direct current resistivity of the region of the subterranean formation.

5. The method of claim 3, wherein the characterizing further includes characterizing a pore solution electrical conductivity of the region of the subterranean formation, $\sigma_w$, based, at least in part, on the resistivity of the region of the subterranean formation.

6. The method of claim 3, wherein the characterizing the resistivity and the capacitance of the region of the subterranean formation includes providing an electromagnetic signal to the region of the subterranean formation with an input electrode and calculating the resistivity and capacitance based, at least in part, on a change in a magnitude and in a shape of the electromagnetic signal as received by an output electrode.

7. The method of claim 1, wherein the method includes selecting the desired critical frequency such that the desired critical frequency for the tracer material differs from a critical frequency of the region of the subterranean formation, wherein the critical frequency of the region of the subterranean formation is a frequency at which the region of the subterranean formation exhibits a maximum in the naturally occurring phase shift vs. frequency trend for the region of the subterranean formation.

8. The method of claim 1, wherein, subsequent to the selecting the desired critical frequency for the tracer material and prior to the flowing the tracer material, the method further includes selecting a characteristic dimension for the tracer material.

9. The method of claim 8, wherein the selecting the characteristic dimension for the tracer material includes selecting the characteristic dimension based, at least in part, on an average effective pore throat diameter for the region of the subterranean formation.

10. The method of claim 8, wherein, subsequent to the selecting the characteristic dimension for the tracer material and prior to the flowing the tracer material, the method further includes selecting the tracer material.

11. The method of claim 10, wherein the selecting the tracer material includes selecting an electrode-electrolyte capacitance per unit area for the tracer material, $C_o$, and a surface area to volume ratio for the tracer material, $s_f$, for a given characteristic dimension for the tracer material such that an actual critical frequency of the tracer material corresponds to the desired critical frequency of the tracer material.

12. The method of claim 10, wherein the method includes selecting the tracer material utilizing the equation:

$$f_c = \frac{\sigma_w}{\pi C_o} \frac{3}{a^2 s_f}$$

where $\sigma_w$, is a pore solution electrical conductivity of the region of the subterranean formation, $C_o$ is an electrode-electrolyte capacitance per unit area for the tracer material, a is an average effective particle radius of the tracer material, and $s_f$ is a surface area to volume ratio for the tracer material.

13. The method of claim 10, wherein the method includes selecting the tracer material such that an electrical conductivity of the tracer material is greater than a pore solution electrical conductivity of a pore solution that extends within the subterranean formation.

14. The method of claim 1, wherein the providing the input electromagnetic signal includes at least on of:
  (i) providing an input AC electric signal; and
  (ii) providing an input AC magnetic signal.

15. The method of claim 1, wherein the providing the input electromagnetic signal includes providing via an electromagnetic geophysical method.

16. The method of claim 1, wherein the receiving the output electromagnetic signal includes receiving across an output frequency range, wherein the output frequency range has a minimum output frequency of at least 0.01 Hz and a maximum output frequency of at most 1,000 Hz.

17. The method of claim 1, wherein the receiving the output electromagnetic signal includes at least on of:
  (i) receiving an output AC electric signal; and
  (ii) receiving an output AC magnetic signal.

18. The method of claim 1, wherein the method further includes calculating a phase shift between the input electromagnetic signal and the output electromagnetic signal, wherein the calculating the phase shift includes quantifying the phase shift as a function of frequency of the input electromagnetic signal, wherein the calculating the phase shift includes quantifying the phase shift as a function of location within the region of the subterranean formation, and further wherein the determining the spatial distribution of the tracer material within the region of the subterranean formation includes spatially correlating a maximum phase shift observed at a corresponding frequency with a given location within the region of the subterranean formation.

19. The method of claim 18, wherein the determining the spatial distribution of the tracer material includes calculating a concentration of the tracer material within the given location based, at least in part, on a magnitude of the maximum phase shift.

20. The method of claim 18, wherein the determining the spatial distribution of the tracer material includes calculating a volume fraction of the tracer material within the given location based on the following equation:

$$\phi_c = \frac{9}{4} \frac{v_{cond}}{1 + v_{cond}}$$

where $\phi_c$ is the maximum phase shift and $v_{cond}$ is the volume fraction of the tracer material within the given location.

21. A method of determining a spatial distribution of an injected tracer material within a subterranean formation, the method comprising:
flowing, via a wellbore that extends within the subterranean formation, a tracer material into a region of the subterranean formation, wherein the tracer material includes a tracer electrical capacitance that differs from a formation electrical capacitance of the region of the subterranean formation;
subsequent to the flowing, providing an input electromagnetic signal to the region of the subterranean formation;
responsive to the providing, receiving an output electromagnetic signal from the region of the subterranean formation; and
determining the spatial distribution of the tracer material within the region of the subterranean formation based, at least in part, on the output electromagnetic signal;
wherein the method further includes calculating, based, at least in part on the input electromagnetic signal and the output electromagnetic signal, a capacitance of the region of the subterranean formation and a resistivity of the region of the subterranean formation as a function of location within the region of the subterranean formation, wherein the determining the spatial distribution of the tracer material within the region of the subterranean formation includes determining based, at least in part, on the capacitance of the region of the subterranean formation and on the resistivity of the region of the subterranean formation.

22. A method of determining a spatial distribution of an injected tracer material within a subterranean formation, the method comprising:
flowing, via a wellbore that extends within the subterranean formation, a tracer material into a region of the subterranean formation, wherein the tracer material includes a tracer electrical capacitance that differs from a formation electrical capacitance of the region of the subterranean formation;
subsequent to the flowing, providing an input electromagnetic signal to the region of the subterranean formation;
responsive to the providing, receiving an output electromagnetic signal from the region of the subterranean formation; and
determining the spatial distribution of the tracer material within the region of the subterranean formation based, at least in part, on the output electromagnetic signal;
wherein, subsequent to the providing the input electromagnetic signal and prior to the receiving the output electromagnetic signal, the method further includes ceasing the providing the input electromagnetic signal, wherein the receiving the output electromagnetic signal includes quantifying a relaxation of the input electromagnetic signal within the region of the subterranean formation, wherein the quantifying the relaxation includes quantifying the relaxation as a function of frequency of the input electromagnetic signal, wherein the quantifying the relaxation includes quantifying the relaxation as a function of location within the region of the subterranean formation, and further wherein the determining the spatial distribution of the tracer material within the region of the subterranean formation includes spatially correlating the relaxation of the input electromagnetic signal with a given location within the region of the subterranean formation.

23. A method of determining a spatial distribution of an injected tracer material within a subterranean formation, the method comprising:
flowing, via a wellbore that extends within the subterranean formation, a tracer material into a region of the subterranean formation, wherein the tracer material includes a tracer electrical capacitance that differs from a formation electrical capacitance of the region of the subterranean formation;
subsequent to the flowing, providing an input electromagnetic signal to the region of the subterranean formation;
responsive to the providing, receiving an output electromagnetic signal from the region of the subterranean formation; and
determining the spatial distribution of the tracer material within the region of the subterranean formation based, at least in part, on the output electromagnetic signal;
wherein the method further includes calculating an amplitude shift between the input electromagnetic signal and the output electromagnetic signal, wherein the calculating the amplitude shift includes quantifying the amplitude shift as a function of frequency of the input electromagnetic signal, wherein the calculating the amplitude shift includes quantifying the amplitude shift as a function of location within the region of the subterranean formation, and further wherein the determining the spatial distribution of the tracer material within the region of the subterranean formation includes spatially correlating the amplitude shift with a given location within the region of the subterranean formation.

24. The method of claim 23, wherein the receiving the output electromagnetic signal includes quantifying at least one property of the output electromagnetic signal as a function of location within the region of the subterranean formation.

25. The method of claim 24, wherein the determining the spatial distribution includes inverting the at least one property of the output electromagnetic signal as a function of location within the region of the subterranean formation.

26. The method of claim 24, wherein the determining the spatial distribution includes:
(i) determining a resistivity as a function of location within the region of the subterranean formation; and
(ii) determining a capacitance as a function of location within the region of the subterranean formation.

27. The method of claim 26, wherein the method includes calculating the spatial distribution of the tracer material within the region of the subterranean formation based, at least in part, on the resistivity as a function of location within the region of the subterranean formation and the capacitance as a function of location within the region of the subterranean formation.

\* \* \* \* \*